United States Patent [19]
Mercer et al.

[11] Patent Number: 5,146,293
[45] Date of Patent: Sep. 8, 1992

[54] PHASE-STEPPING FIBER-OPTIC PROJECTED FRINGE SYSTEM FOR SURFACE TOPOGRAPHY MEASUREMENTS

[75] Inventors: Carolyn R. Mercer, Cleveland; Glenn Beheim, Hiram, both of Ohio

[73] Assignee: The United States of America as represented by the Administrator of the National Aeronautics and Space Administration, Washington, D.C.

[21] Appl. No.: 703,435

[22] Filed: May 13, 1991

[51] Int. Cl.$^5$ ............................................. G01B 11/02
[52] U.S. Cl. .................................. 356/356; 356/360; 356/376; 382/26; 364/575
[58] Field of Search ............... 356/356, 359, 360, 376; 364/525, 575; 382/5, 26

[56] References Cited

U.S. PATENT DOCUMENTS

| | | | |
|---|---|---|---|
| 3,520,607 | 7/1970 | Zoot | 356/167 |
| 4,639,139 | 1/1987 | Wyant et al. | 356/359 |
| 4,677,302 | 6/1987 | Chiu et al. | 250/560 |
| 4,695,163 | 9/1987 | Schachar | 356/369 |
| 4,732,483 | 3/1988 | Biegen | 356/351 |
| 5,042,949 | 8/1991 | Greenberg et al. | 356/359 |

OTHER PUBLICATIONS

W. T. Welford, "Some Applications of Projected Fringes", Optica Acta, vol. 16, pp. 371-379 (1969).

*Primary Examiner*—Samuel A. Turner
*Assistant Examiner*—LaCharles P. Keesee
*Attorney, Agent, or Firm*—James A. Mackin; Gene E. Shook; Guy M. Miller

[57] ABSTRACT

A projected fringe interferometer for measuring the topography of an object periodically steps the phase angle between a pair of light beams emanating from a common source. The steps are $\pi/2$ radians (90°) apart and at each step a video image of the fringes is recorded and stored. Photodetectors measure either the phase angle $\theta$ of the beams or $2\theta$ either of which is used to control one of the light beams so the 90° $\theta$ is accurately maintained. A camera, a computer, a phase controller and a phase modulator established closed-loop control of $\theta$. Measuring the phase map of a flat surface establishes a calibration reference.

5 Claims, 2 Drawing Sheets

PHASE-STEPPING FIBER-OPTIC PROJECTED FRINGE SYSTEM FOR SURFACE TOPOGRAPHY MEASUREMENTS

ORIGIN OF THE INVENTION

This invention was made by Government employees and may be manufactured or used by or for the Government without the payment of any royalties thereon or therefor.

FIELD OF THE INVENTION

This invention relates to apparatus for measuring the topography of irregularly shaped objects. It is directed more particularly to a fiber optic interferometer for making such measurements based on the phase relationships of two light beams.

An interferometer is an instrument used for comparing optical wavelengths with a standard of length by means of interference fringes. A Fabry-Perot interferometer is an instrument in which circular interference fringes are produced by the passage of monochromatic light through a pair of plain, parallel, half-silvered glass plates, one of which is fixed while the other may be moved by an accurately calibrated screw. By observing the fringes while changing the plate separation by means of the screw, the wavelength of the light may be measured.

Projected fringes can be used to measure the surface topography of an object as described by W. T. Welford in Optica Acta, Vol. 16, p. 371–379 (1969). Two mutually coherent plane waves are made to cross to generate a system of parallel plane interference fringes in the region of space surrounding an object the topography of which is to be determined. The light pattern produced on the object's surface allows one to determine the shape of the surface.

DESCRIPTION OF THE PRIOR ART

U.S. Pat. No. 3,510,607 to Zoot discloses a gage for contour mapping in which a single light beam is split into a plurality of secondary beams. The beams are periodically interrupted and then focused upon an object the contours of which are being measured. When the surface of the object does not coincide with the focal point of the beams, multiple images are produced. Light reflected from the object is wept over a receiving reticle disposed in the optical path in front of an optical detector in synchronism with the interruption of the beams. The changes in phase of the detector output is indicative of the deviation in distance from the focal point coincidence.

U.S. Pat. No. 4,695,163 to Schachar discloses a method in apparatus for determining surface shapes using reflected laser light. The system detects the reflected light and determines the position of maximum polarization.

U.S. Pat. No. 4,639,139 to Wyant et al. discloses an optical profiler using improved phase shifting interferometry. Open-loop phase-shifting is used and because of temperature variations and vibrations the accuracy of the system is compromised. The physical layout of the apparatus also restricts the dimensions in positioning of the test object.

U.S. Pat. No. 4,677,302 to Chiu et al. discloses a system for inspecting printed circuit boards utilizing a ramp filter disposed between a beam reflected from an object and a photodetector. This system measures a surface along the lien and most be scanned in one dimension to get an entire surface measurement. The displacement of the beam is measured and related to surface height, but is useful for only coarse surface height measurements, such as a component on a printed circuit board.

U.S. Pat. No. 4,732,483 to Biegen discloses an interferometric profiler for measuring the topography of a surface. A laser beam is split in two directed to a beam splitter, focused on an object which reflects the beam to an imaging device. The output of the imaging device is connected to an electronic processor and a video monitor. This apparatus also restricts the dimensions and position of the test object.

As discussed above, it was known in the prior art to have two mutually coherent plane waves cross to generate a system of parallel plane interference fringes in the region of space surrounding an object. The light pattern produced on the object surface allows the shape or topography of the surface to be measured.

Standard projected fringe methods have several drawbacks. First, data processing is difficult as an electronically recorded image of the fringes shown on the object cannot be converted readily to a topographical map of the objects surface. Secondly, sensitivity to normal displacements is generally insufficient for most non-destructive testing applications.

Many of the above shortcomings of projected-fringe interferometer systems have been eliminated or minimized by a method of phase-stepping. A projected-fringe system using open-loop phase-stepping has been described by V. Srinivasan, et al. (Appl. Opt. Vol. 23, pp. 3105–3108, 1984). A disadvantage of open-loop phase-stepping systems is that phase-measurement errors can be caused by temperature changes and mechanical disturbances.

SUMMARY OF THE INVENTION

The invention provides a method and apparatus for closed-loop phase-stepping of projected interference fringes. The relative phase of two interfering plane waves which produce fringes on an object is stepped periodically by 90°. At each change of 90°, an image of the fringes is recorded so that four images of the fringes appearing on the object are recorded for each cycle of 360°.

To insure that the phase-stepping is done at very precise 90° intervals, a closed-loop phase-control system is utilized. The phase-control system employs a phase controller which receives signals from a photodetector which measures the phase angle $\theta$ of the light waves and from a computer and utilizes these signals to control a phase modulator disposed in an optical fiber which carries one of the light beams which will fall on the object to be measured. A camera records the fringe pattern on the object being measured and directs the resulting signal to the computer.

Either of two photodetectors can be used to generate a phase indicating signal for the controller. In one case, reflected light is used and has the advantage that the signal is easily obtainable. However, twice the relative phase angle $\theta$ is measured which may cause a 180° phase-stepping ambiguity.

In the second case, transmitted light is used to directly measure the phase.

DESCRIPTION OF A PREFERRED EMBODIMENT OF THE INVENTION

Figure 1:
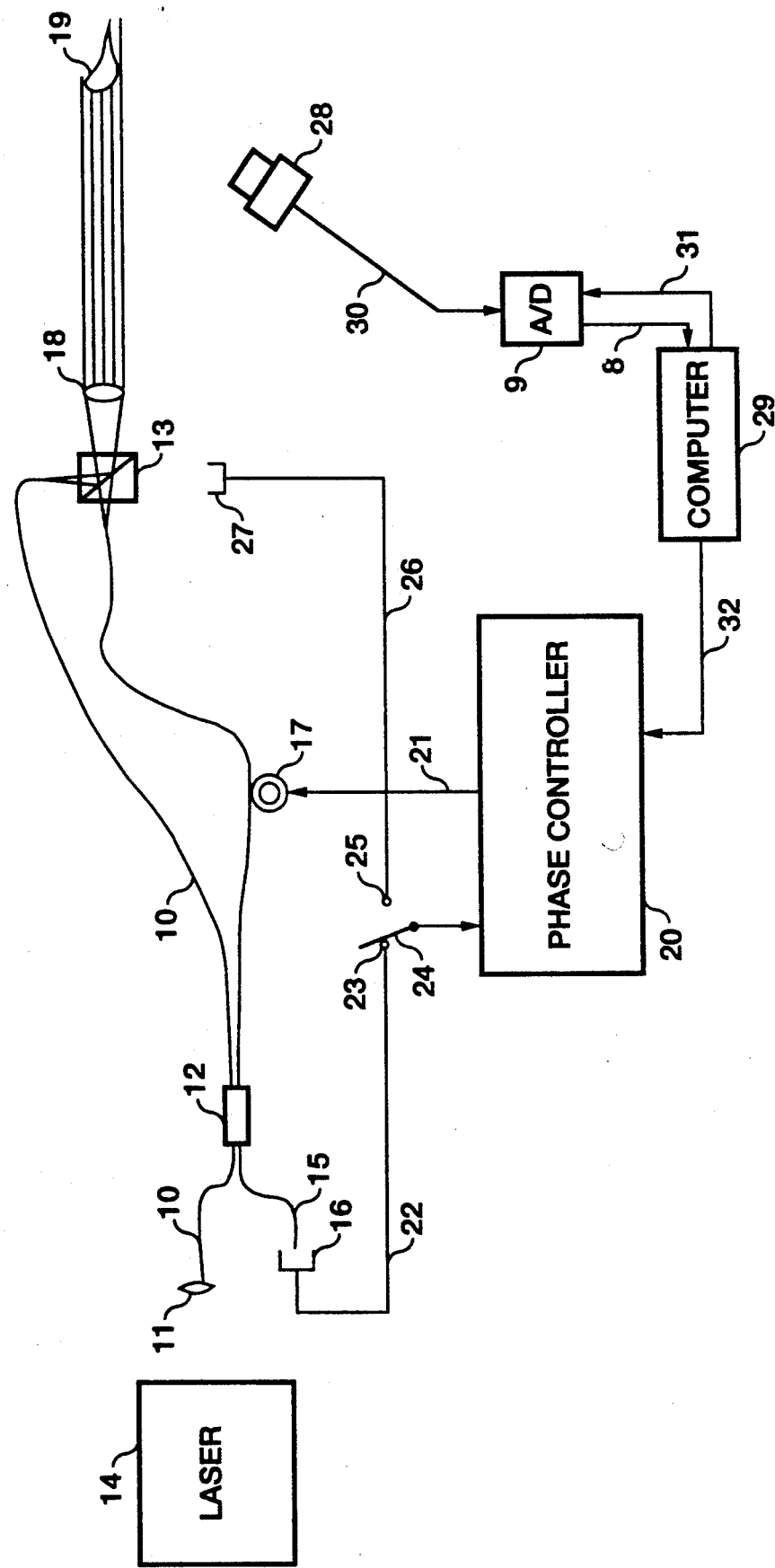
FIG. 1 is a schematic diagram of a closed-loop phase-stepping projected fringe measuring apparatus.

Referring now to FIG. 1, there is shown an optical fiber 10 which extends from near lens 11 through an optical coupler 12 to a point adjacent to, but not contacting, a beam splitter 13. Lens 11 is adjacent to a laser 14 which emits a beam of monochromatic, coherent light. A second optical fiber extends from a photodetector 16 through the coupler 12 and through a phase modulator 17 to the beam splitter 13. The light from laser 14 is split at the coupler 12 so that two distinct beams of light are applied to the beam splitter 13 by optical fibers 10 and 15. The two beams of light are collimated by a lens 18 and projected onto an object such as a turbine blade 19, the topography of which is to be measured. A mirror may be substituted for lens 18. The two beams of light intefere and produce fringes on the object 19.

In order to modulate the light beam in fiber 15, that is, to vary its phase relative to time, a radio frequency signal such as a 10 Kz sine wave is supplied to phase modulator 17 from a phase controller 20 through a connection 21. Added to the sine wave is a dc voltage which controls the phase angle $\theta$ of the light beam and allows it to be adjusted by precise 90° steps.

The photodetector 16 is connected by a lead 22 to contact 23 of a switch, the armature 24 of which is connected to the phase controller 20. A contact 25 of the switch is connected via a lead 26 to a photodetector 27 which is located adjacent to the beam splitter 13 and receives light emitted from fibers 10 and 15. While the photoconductor 27 reads the phase angle $\theta$ of the beams directly, photoconductor 16 reads $2\theta$ because the light reflected from the fiber faces travels through fibers 10 and 15, phase modulator 17 and optical coupler 12 twice. Armature 24 allows selection of either of photodetectors 16 or 27 to signal the phase controller 20.

To record an electronic image of the fringes on object 19 there is provided a video camera 28 which directs electronic images via a lead 30 and an analog to digital converter 9 to a computer 29 for storage and for generation of a signal representative of the fringes on the object 19. A lead 31 carries signals from computer 29 to analog-to-digital (A/D) 9 whereby the A/D sends the images of the fringes to the computer at successively stepped 90° points via lead 33. Computer 29 is connected to the phase controller 20 by a lead 32 to generate control signals as will be discussed with respect to FIG. 2.

Included in the signal supplied to phase modulator 17 from phase controller 20 is a stepping signal which causes the phase difference of the light beams to change to 0°, 90°, 180°, and 270° in successive steps. Camera 28 generates an image of the fringes at each of the steps.

After the four images of the object 19 are recorded, a flat, reflective surface is substituted for object 19 and four images are recorded and stored in computer 29 as done for object 19 and under the same conditions at 0°, 90°, 180°, and 270° angles. Each set of four images is used to compute a phase map according to the relationship $$\tan[\phi(x,y)] = \frac{I_4(x,y) - I_2(x,y)}{I_1(x,y) - I_3(x,y)}$$

where (x,y) denotes an image point, $I_1$, $I_2$, $I_3$, and $I_4$ refer to the images taken at $\theta = 0°$, 90°, 180°, and 270°, respectively, and $\phi$ is the calculated phase map. The computed phase map of the reference flat is subtracted digitally from the phase map of the object in computer 29.

Figure 2:
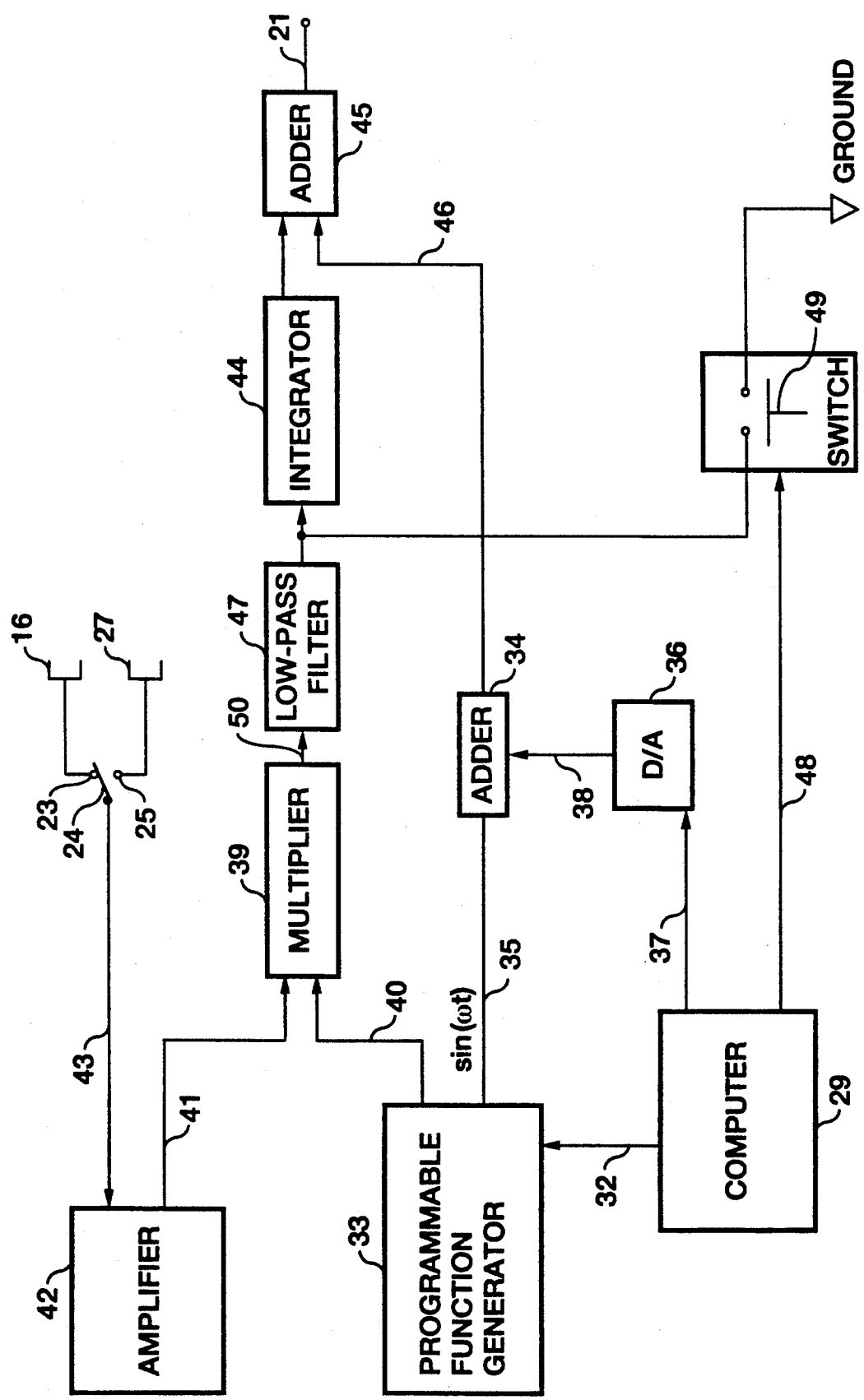
FIG. 2 is a schematic block diagram showing the circuits utilized to control a pair of light beams.

Referring now to FIG. 2, there is shown in block diagram form the electrical circuits of the phase controller 20 of FIG. 1. Parts corresponding to those in FIG. 1 are identified by like numerals.

Programmable function generator 33 provides two output signals. One output signal is sin ($\omega$t) which is directed to a first adder 34 by a lead 35.

The second output of function generator 47 is controlled by computer 29 via a lead 32. The form of this output depends on whether detector 16 or 27 is directing its signal to amplifier 42 via armature 24. If detector 16 is used, the computer 29 selects the second output to be $+\sin(\omega t)$ if $\theta$ is to be 0° or 180°, or $-\sin(\omega t)$ if $\theta$ is to be 90° or 270°. If detector 27 is used, then computer 29 forces the output to be $+\sin(\omega t)$ for $\theta = 0°$, $-\cos(2\omega t)$ for $\theta = 90°$, $-\sin(\omega t)$ for $\theta = 180°$, or $+\cos(2\omega t)$ for $\theta = 270°$.

Computer 29 generates a second digital signal which is applied to digital-to-analog converter (D/A) 36 via a lead 37 in order to coarsely step the phase $\theta$. The value of this digital signal also depends on whether detector 16 or 27 is selected. If detector 27 is used, the signal is always zero and is not required. If detector 16 is used, the signal is initially zero and then is incremented by an amount necessary to change the optical path length of fiber 15 by roughly one-quarter of the wavelength of light emitted from laser 14. The increment is added each time a new phase value is required. D/A 36 generates a dc voltage based on the input from computer 29 and sends it to adder 34 via a lead 38.

Computer 29 generates a third signal which controls armature 49 via a lead 48. This normally-open switch is momentarily closed to deactivate the phase controller while the dc voltage from D/A 36 applied to phase modulator 17 is varied.

The second output of function generator 33 is directed to an input of a multiplier 39 via a lead 40. A second input of multiplier 39 receives an amplified signal of either detector 16 or 17 via a lead 41 from an amplifier 42. Whether amplifier 42 receives an input signal from detector 16 or 17 is determined by the position of armature 24 which is connected by a lead 42 to the amplifier.

The output of multiplier 39 is a high frequency signal which is directed to the input of low-pass filter 47 via a lead 50. The output of filter 47 is a dc voltage which varies as a function of $\theta$ and is directed to an integrator 44. The output of integrator 44 is applied to a first input of second adder 45. A second input of adder 45 receives the output of first adder 34 through a lead 46. The output signal of the adder on lead 21 is directed, as shown in FIG. 1, to the phase modulator 17.

It will be understood that changes and modifications may be made to the above-described invention without departing from its spirit and scope as set forth in the claims appealed hereto.

We claim:

1. Apparatus for measuring the topography of an object and comprising:
   source means for generating a monochromatic, coherent beam of light;
   a beam splitter disposed such that said object is illuminated by said light;
   a first optical fiber for coupling light from said source means to said beam splitter, said optical fiber having an end face adjacent to said beam splitter;
   a second optical fiber having first and second ends, the second end being positioned at the beam splitter such that interference fringes are formed;
   an optical coupler disposed between said first and second optical fibers;
   a first detector located adjacent to first end of said second fiber, for receiving light reflected off the ends of the fibers, the detected light being an indicator of twice the relative phase between the beams emitted from the fibers;
   a second detector for receiving light emitted from the ends of the fibers and transmitted through the beam splitter, the detected light being a direct indicator of the relative phase between the beams emitted from the fibers;
   a phase modulator disposed in said second optical fiber;
   phase controller means connected to said phase modulator to provide a controlling signal thereto, said phase controller means receiving a signal selectively from either said first or said second detector;
   computer means connected to said phase controller means to provide stepping information thereto such that the phase modulator periodically causes the phase angle $\theta$ between the first and second light beams to be 0°, 90°, 180° and 270°; and
   a camera connected to said computer means, said camera recording an image of the fringes on the object at each 90° stepped phase change, said images being stored and used for calculation in said computer means.

2. The apparatus of claim 1 wherein the phase controller means comprises:
   function generator means having first and second outputs, the first output being sin ($\omega$t), the second output being either ±sin ($\omega$t) or ±cos (2$\omega$t);
   multiplier means for multiplying a signal from either said first or said second detector with the second output signal of the function generator means;
   filter means for extracting the slowly varying component of the output signal of said multiplier which is proportioned to either sin (2$\theta$) if said phase controller receives its signal from said first detector, and which is proportional to either sin ($\theta$) or cos ($\theta$) if said phase controller receives its signal from said second detector;
   integrator means for integrating the filtered signal from said multiplier;
   second adder means for adding the filtered, integrated signal from said multiplier and the output of the said first adder to produce a modulator controlling signal in order to set and maintain the phase angle $\theta$.

3. The apparatus of claim 2 including means for selecting said second output of said function generator such that, when said phase controller is receiving a signal from said first detector, +sin ($\omega$t) is selected when the phase angle $\theta$ is desired to be 0° to 180°, and −sin ($\omega$t) is selected when $\theta$ is desired to be 90° or 270°.

4. The apparatus of claim 2 including means for selecting said second output of said function generator such that, when said phase controller is receiving a signal from said second detector, −sin ($\omega$t) is selected when the phase angle $\theta$ is desired to be 0°, −cos (2$\omega$t) is selected when $\theta$ is desired to be 90°, −sin ($\omega$t) is selected for 180°, and +cos (2$\omega$t) is selected for 270°.

5. The apparatus of claim 2 including means to momentarily disable said integrator while a bias voltage is applied to said phase modulator in order to cause the phase angle $\theta$ to be stepped by approximately 90° when said phase controller receives its signal from said first detector.

* * * * *